United States Patent
Trentinaglia et al.

(10) Patent No.: US 10,323,953 B2
(45) Date of Patent: Jun. 18, 2019

(54) INPUT OF NAVIGATIONAL TARGET DATA INTO A NAVIGATION SYSTEM

(71) Applicant: Bayerische Motoren Werke Aktiengesellschaft, Munich (DE)

(72) Inventors: Luca Trentinaglia, Eichenau (DE); Christian Kuehnel, Munich (DE)

(73) Assignee: Bayerisch Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/074,541

(22) Filed: Mar. 18, 2016

(65) Prior Publication Data

US 2016/0273931 A1 Sep. 22, 2016

(30) Foreign Application Priority Data

Mar. 20, 2015 (DE) .................. 10 2015 205 044

(51) Int. Cl.
*G01C 21/36* (2006.01)
*G10L 15/00* (2013.01)

(52) U.S. Cl.
CPC .......... *G01C 21/3608* (2013.01); *G10L 15/00* (2013.01)

(58) Field of Classification Search
CPC .................................................. G01C 21/3608
See application file for complete search history.

(56) References Cited

U.S. PATENT DOCUMENTS

| | | | | |
|---|---|---|---|---|
| 6,411,893 B2* | 6/2002 | Ruhl | .................. | G01C 21/3608 379/88.01 |
| 6,456,931 B1* | 9/2002 | Polidi | ................ | G01C 21/3415 340/990 |
| 6,996,469 B2* | 2/2006 | Lau | .................... | G01C 21/3617 340/995.21 |
| 7,184,957 B2* | 2/2007 | Brookes | .................. | G10L 15/08 704/246 |
| 7,831,433 B1* | 11/2010 | Belvin | .................... | G10L 15/18 704/275 |
| 8,086,463 B2* | 12/2011 | Ativanichayaphong | .................... | G09B 5/06 704/275 |

(Continued)

FOREIGN PATENT DOCUMENTS

DE 198 39 378 A1 3/2000
DE 10 2006 051 228 A1 5/2000

(Continued)

OTHER PUBLICATIONS

German Search Report issued in counterpart German Application No. 10 2015 205 044.0 dated Nov. 19, 2015 with partial English translation (14 pages).

*Primary Examiner* — Hussein Elchanti
*Assistant Examiner* — Michael A Berns
(74) *Attorney, Agent, or Firm* — Crowell & Moring LLP

(57) ABSTRACT

For the input of navigational target data into a navigation system by way of a facility for a mobile radio voice link, voice signals or signals derived therefrom, transmitted via the mobile radio voice link, are processed by a voice recognition device for recognizing spoken words. By way of at least one word recognized during this process, a comparison of targets with navigational target entries in a navigation database takes place. In the case of a positive result of the comparison, the corresponding navigational target entry is provided for input as navigation target in the navigation system.

16 Claims, 4 Drawing Sheets

(56) References Cited

U.S. PATENT DOCUMENTS

| | | | |
|---|---|---|---|
| 8,452,533 B2* | 5/2013 | Pierfelice | G01C 21/3608 |
| | | | 455/412.1 |
| 9,175,967 B2* | 11/2015 | Abramson | G01C 21/3697 |
| 9,448,991 B2* | 9/2016 | Suessenguth | G06F 17/273 |
| 2003/0212479 A1 | 11/2003 | Baghshomali et al. | |
| 2007/0124057 A1* | 5/2007 | Prieto | G10L 15/26 |
| | | | 701/532 |
| 2007/0276586 A1* | 11/2007 | Jeon | G01C 21/3608 |
| | | | 701/533 |
| 2008/0249711 A1 | 10/2008 | Matsuda | |
| 2010/0131191 A1 | 5/2010 | Ohki | |
| 2010/0250253 A1* | 9/2010 | Shen | H04R 1/1041 |
| | | | 704/260 |
| 2013/0217370 A1 | 8/2013 | Gerald et al. | |
| 2013/0253830 A1* | 9/2013 | Breisinger | G01C 21/3632 |
| | | | 701/533 |
| 2015/0169171 A1* | 6/2015 | Fotland | G06F 3/04812 |
| | | | 715/835 |
| 2016/0173931 A1* | 6/2016 | Eber | H04N 21/242 |
| | | | 725/38 |
| 2016/0239762 A1* | 8/2016 | McCord | G06N 7/005 |
| 2017/0011742 A1* | 1/2017 | Jing | G10L 15/1822 |

FOREIGN PATENT DOCUMENTS

| | | |
|---|---|---|
| DE | 100 48 576 A1 | 4/2002 |
| EP | 1 341 363 A1 | 9/2003 |
| EP | 2 437 032 A2 | 4/2012 |
| EP | 2 447 926 A1 | 5/2012 |

* cited by examiner

INPUT OF NAVIGATIONAL TARGET DATA INTO A NAVIGATION SYSTEM

CROSS REFERENCE TO RELATED APPLICATION

This application claims priority under 35 U.S.C. § 119 from German Patent Application No. 10 2015 205 044.0, filed Mar. 20, 2015, the entire disclosure of which is herein expressly incorporated by reference.

BACKGROUND AND SUMMARY OF THE INVENTION

The invention relates to a method, a system and a corresponding vehicle for the input of navigational target data into a navigation system.

Navigational target data can be input into navigation systems in various ways. In many navigation systems, an input is text based, for example by means of key pressure on electromechanical keyboards or on so-called touch screens, selection by means of a click on a computer mouse or by means of a so-called scroll wheel, etc. Towns and street names and corresponding digits or numbers, e.g. zip codes and/or house numbers, can be input as texts.

Navigational target data can also be transmitted, for example, from a computer to a navigation system and adopted there for the route guidance. A corresponding system is known, for example, by the BMW Online service.

From DE 100 48 576 A1, it is known to convey control messages to a vehicle control by SMS. In DE 198 39 378 A1, a system is described in which a navigation device consists of a mobile subsystem which is connected to a stationary subsystem via a communication link. From DE 10 2006 051 228 A1, it is known to send a target address by SMS to a mobile radio telephone. In US 2010/131191 A, it was described to detect free texts in so-called messaging services, there also being the possibility of providing a voice recognition system.

The contents of the above-mentioned publications are herewith incorporated in the present description by reference as non-essential matter.

It is an object of the invention to improve the input of navigational target data into a navigation system.

This and other objects are achieved by a method according to the invention, in which a facility for a mobile radio voice link is used for the input of navigational target data into a navigation system. Voice signals, which include signals derived therefrom, transmitted via the mobile radio voice link, are processed by way of a voice recognition device for recognizing spoken words. By way of at least one word recognized during this process, a comparison of targets with navigational target entries in a navigation database takes place. In the case of a positive result of the comparison, the corresponding navigational target entry is provided for input as a navigation target in the navigation system.

The invention is based on the finding that navigation systems are connected in many cases with other, particularly computer-controlled systems and the respective existing connection can be used advantageously for a need-oriented and very user-friendly, wholly or partially automated input of navigation targets. In this context, it was also found that, for example, a connection to a mobile radio system can be utilized for recognizing signals transmitted via a mobile radio channel, particularly voice signals but also data such as, e.g., messages transmitted by SMS, email or messages transmitted by a social network such as Facebook or Twitter, by means of currently available technology such as, e.g., voice recognition, text recognition and/or navigation targets addressed in each case by a self-learning system and then advantageously providing them for input into the navigation system. In this context, for example, a system which converts text data from an email or an SMS into voice, a so-called text-to-speech system can also be used advantageously for the purpose of providing the navigation target by using this system for analyzing the text data. It can be used additionally also for the acoustic output of the respective navigational target entry.

By means of the comparison of targets, it is possible to achieve, in particular, that a target address "Lehnbachplatz 3, Munich" contained in recognized spoken words, e.g. "drive to Lehnbachplatz 3 in Munich", is recognized and provided for input into the navigation system. The target address can then be accepted advantageously wholly or partially automatically into the navigation system for route guidance. Advantageously, the respective user, particularly a vehicle driver, does not need to know or note the respective address and, therefore, is not distracted by such actions.

According to an advantageous exemplary embodiment of the invention, additionally to the comparison of targets, a keyword comparison between at least one word, which was recognized by the voice recognition, and at least one navigational keyword stored in a database takes place. The database used in this process can be, in particular, the navigation database and/or a keyword database independent thereof. In the case of a correspondence of the at least one spoken, recognized word, particularly of a corresponding spoken phrase, with the at least one keyword or a corresponding keyword phrase stored in a database, the comparison of targets takes place. In particular, the keyword comparison can precede the target comparison or take place in a common step.

The spoken and recognized word for the keyword comparison can be the same word or the same phrase, i.e. group of words, e.g. the phrase "homewards", as the spoken and recognized word for the target comparison. In this case, the two comparisons virtually coincide to form one comparison. In the comparison of phrases, the respective order of the words can be optionally taken into consideration or not taken into consideration.

For the comparison of targets, it can also be provided that data of targets with respect to respective navigation targets, stored in the navigation database, comprise category data which in each case describe a category of the target. In particular, categories relating to so-called points of interest (POIs) which characterize prominent points in the countryside such as, e.g., a river, a landmark such as, e.g., a castle, a museum or a monument and/or infrastructure facilities such as, e.g., bridges, traffic lights, telephone booths, shops, etc. can be provided as corresponding target categories. For the respective POIs, their corresponding names can be stored in the navigation database. For the target comparison, a recognized spoken word can be compared, in particular, with a respective category designation such as, e.g., the designation river, castle, monument, etc. and/or with a name of the respective POI. A combined comparison of a spoken phrase by means of a combination of the category designation of a POI and the respective name of the POI can also be carried out. For example, a comparison of the spoken and recognized phrase "Nymphenburg castle" with the category designation "castle" and the name "Nymphenburg" of the POI leads to a positive recognition result.

For the target comparison, it can also be provided that typical samples for coordinates are used for the target input, e.g., the words "48 degrees 8 minutes 7 seconds north 11 degrees 30 minutes 17 seconds east" can be combined to form one specification of coordinates and proposed as a navigation target.

If the navigation system has already selected a navigation target and an additional navigation target has been recognized in the keyword comparison, it can be offered to the driver of the vehicle to optionally use this additional navigation target as a new intermediate target for the existing route.

For the keyword comparison, words or phrases can be provided as keywords, in particular, which include actions such as, e.g., navigation maneuvers, direction information and/or instructions, for example the words "turning", "turn", "to the right", "to the left", "after <<number>> meters" (the dummy <<number>> standing for a number), or "pick up <<object>>" (the dummy <<object>> standing for an expression with an arbitrary object). In particular, at least one spoken and recognized word can be compared additionally to the keyword comparison and/or the target comparison, with predetermined pairs, particularly stored in the keyword database or the navigation database, of location and action information, and potential target addresses can be determined on the basis of this comparison. In particular, driving maneuvers can be provided as action information. A pair of location and action information can contain, for example, the phrase "please stop at Rewe supermarket".

In particular, the invention is associated with the advantage that the user of the navigation system does not have to input a navigation target address transmitted by a call party by voice, in text form on an input system but automatically obtains already one or more proposals for a target address. In particular, he can then accept or reject the respective proposal. It can also be provided that the navigation system automatically accepts a target address if the input system has recognized it unambiguously.

In this context, it can be achieved, particularly for the driver of a motor vehicle, that he is not distracted from driving the motor vehicle by any manual input of a target address. In particular, the invention can be used especially advantageously in those applications in which already various, particularly all, system components necessary for the invention, particularly hardware components, are already provided in a vehicle. For this purpose, for example, a so-called telematics unit with components to establish a radio link can be provided in the vehicle, particularly for a mobile radio link, e.g. with a SIM card and with a telecommunications interface which, for example, contains components with which a connection according to the mobile radio standard Global System for Mobile Communications (GSM) G2, G3, G4 or higher can be established, and/or for establishing a Wireless Local Area Network (WLAN) connection.

In the sense of the invention, there is no strict distinction between signals and data and between analog and digital signals. Voice signals can be, therefore, e.g. analog signals or else coded as digital voice data.

Individual ones, or several of the method steps described in this document, particularly the transmission and/or processing of the voice signals, which includes the signals derived therefrom, and/or the target comparison can take place wholly or partially in the facility for the mobile radio voice link, particularly in a mobile telephone, in a vehicle and/or in a facility outside the vehicle, particularly in a so-called backend server. For this purpose, corresponding hardware and/or software-related components such as a comparator, a signal processor, a processor, a database, a memory, a navigation system with a positioning facility, etc. can be provided in the respective facility.

A backend server is, in particular, a computer which can be connected for data to a vehicle, for example via a corresponding radio link, and, in particular, a computer connected thereto. A backend server is typically contactable by a plurality of vehicles, particularly by a fleet of vehicles and/or by a vehicle manufacturer, for a data exchange.

According to a further advantageous exemplary embodiment of the invention, at least two spoken and recognized words adjacent to one another such that, in the spoken context, they have a predetermined minimum distance and/or a predetermined maximum distance from one another, are used for the comparison of targets and/or the keyword comparison. The spacing of adjacent words can then be measured as word spacing and/or in time. According to this exemplary embodiment, in particular, suitable phrases can be utilized for the respective comparison.

In a further advantageous exemplary embodiment of the invention, for the provision of the navigational target data, the navigational target entry is output on an output unit. The output unit can be configured, in particular, for the output of optical and/or acoustic signals. For this purpose, it can include, for example, a screen, a so-called head up display and/or a hands-free system.

The navigational target data output on the output unit can be advantageously selectable by use of an input unit. For this purpose in particular, navigational target data for a number of navigation targets recognized as potential targets during the target comparison can be output for selection. For this purpose, the output can take place, for example, graphically in the form of a list which contains the various potential targets. The input unit can include, for example, a touch-sensitive screen (touch screen), mechanical or graphically represented keys, a computer mouse, a scroll wheel and/or a microphone. The input unit can be operated, in particular, manually and/or by voice input.

For the comparison of a respective recognized spoken word with the words stored in the respective database and/or for the output of the navigational target data, presetting of at least one comparison and/or output rule can take place. By this means, there can be a user-specific adaptation of comparison processes and/or comparison facilities, in particular. For example, user-specific preferences of particular words and/or phrases can be taken into consideration by this means such as, e.g. "keep to the right". User-specific preferences of particular orientation criteria in route guidance, for example for target categories which apply to buildings, forms of countryside and/or road properties can also be taken into consideration in this context. Certain navigational target data such as addresses and/or categories can also be pre-ferred user-specifically in a so-called white list, particularly only these may be allowed for the target comparison, and/or they may be locked in a so-called black list.

For a presetting and/or a change of the at least one comparison and/or output rule, a self-learning system can be advantageously provided, the user-specific preferences, e.g., being determined wholly or partially automatically on the basis of a plurality of selection processes.

The provision, output and/or selection of the navigational target data can be controlled, in particular, by use of a position sensor which determines the current position of the respective user and/of the navigation system. In this context, navigation targets can be all the more preferred the closer they are to the current location of the user or the navigation system, respectively.

As part of the invention, an input system for the input of navigational target data into a navigation system by way of a facility for a mobile radio voice link can also be specified. The input system includes a voice recognition device for processing voice signals transmitted via the mobile radio voice link or signals derived therefrom, for the recognition of words. Furthermore, it includes a target comparison device which is configured to perform, by way of at least one word recognized by the voice recognition device, a comparison with navigational target entries in a navigation database, and in the case of a positive result of the comparison, to provide data of the corresponding navigational target entry as navigational target data for input into the navigation system.

The input system can be, in particular, a component of a navigation system. The navigation database can be provided, for example, in the input system or in a separate navigation system. The input system can include, in particular, means for performing one or more method steps according to the method described further above.

As part of the invention, a vehicle can also be specified which has an input system described in this document.

The input system can be provided, in particular, as a driver assistance system for a vehicle. It can be advantageously configured to be switchable in such a manner that it can be switched on and off optionally by the vehicle driver. In particular, it can be provided wholly or partially in the vehicle. For example, the voice recognition and/or a comparison device for the keyword comparison can be provided in the vehicle and the navigation database and/or the target comparison device in a backend server outside the vehicle.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
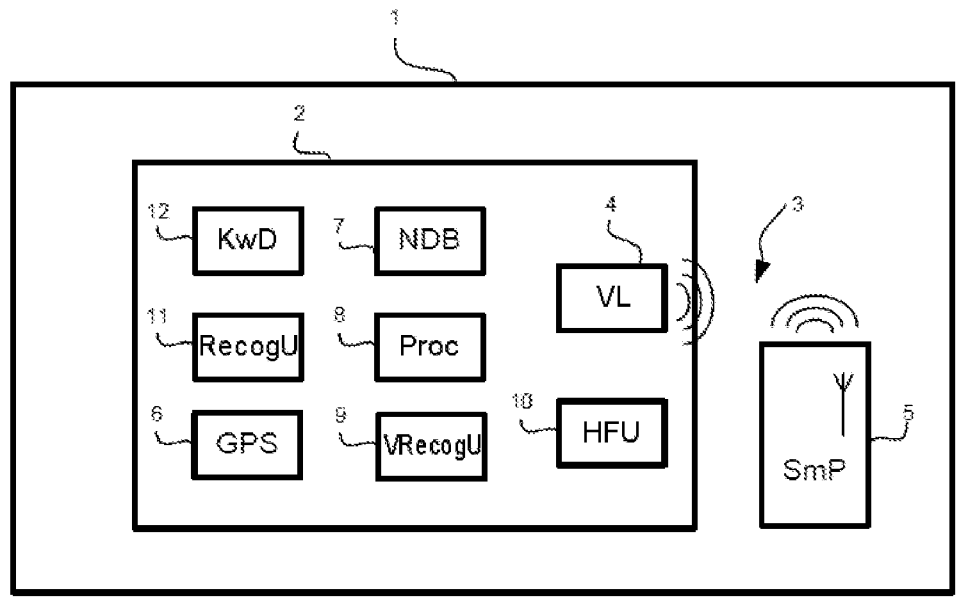
FIG. 1 is a schematic block diagram illustrating a vehicle with a navigation system.

The vehicle 1 shown diagrammatically in FIG. 1 has a navigation system 2 which includes a conventional sensor 6 for the Global Positioning System (GPS). Furthermore, the navigation system 2 can be connected via a wireless radio link 3, e.g. according to the Bluetooth radio standard, by way of a Bluetooth interface 4 to a mobile telephone 5 located in the vehicle 1. When the link has been set up, the vehicle driver can conduct a telephone call by use of the mobile telephone 5 via the interface 4 and a hands-free device 10 connected thereto, with a call partner. For this purpose, the hands-free device 10 has a loudspeaker and a microphone. Call signals or corresponding digital call data, received at and/or transmitted from the hands-free device 10 are processed by a voice recognition unit 9, integrated in the navigation system 2, for recognizing the words spoken in each case. The voice recognition unit 9 is controlled by software which is processed on a processor 8 of the navigation system 2. For this purpose, the voice recognition unit 9 has an internal voice database, not shown here. Voice recognition can take place, in particular, in real time or "on-the-fly" during the conduct of the call.

Furthermore, a target recognition device 11 is provided in the navigation system 2 which is also controlled by software which is processed on the processor 8 of the navigation system 2. Respective data relating to the words recognized by the voice recognition unit 9 and spoken by the two telephone call partners, especially by the call partner outside the vehicle 1, are processed further by the target recognition device 11. In this process, the recognized spoken words are compared in a first software-controlled process with keyword entries in the keyword database 12 in a keyword comparison. As keywords, for example, words and phrases such as "target", "navigation", "route guidance", "visiting", "drive", "come", "homeward", "to the office", "to the company," etc. can be stored in the keyword database 12. Words or phrases can also be provided which include navigational maneuvers and/or directional information, for example the words "turning", "turn", "right", "left", "after <<number>> meters" (the dummy <<number>> standing for a number). In order to identify the call partner outside the vehicle 1 and selectively only supply the data of the words spoken by him to the voice recognition unit 9 and/or the target recognition device 11, the respective voice signals or voice data can be identified, marked and/or filtered, for example, at the Bluetooth interface 4, at the mobile radio device 5 and/or at the hands-free device 10. Identification can take place, for example, by means of the respective transmission channel for voice signals received from outside at the vehicle 1.

When the voice recognition unit 9 has determined, by way of the keyword comparison, such a keyword or such a key phrase in the recognized spoken words, a second software-controlled process is performed in the target recognition device for the target comparison in which recognized spoken words, particularly those which were spoken within a predetermined limit of, for example, 10 words in each case before and after the spoken keyword, previously already identified, by one of the call partners, particularly by the one who is located outside the vehicle, are compared with navigational target entries in a navigation target database 7 of the navigation system 2.

In the navigation target database 7, geo-referenced data normally used in navigation systems, are stored, in particular, which also contain data relating to, in each case, associated countries, towns, cities, roads, house numbers, etc. In addition, respective entries, particularly for POIs, can have a reference to a corresponding category such as, e.g., prominent countryside points, landmarks and/or infrastructure facilities. Corresponding POIs can also be referenced to corresponding names and/or pictures, for example with respect to the geographic data of a shopping market, its category features business-supermarket and its trade name such as, e.g., "Rewe" can be stored.

Figure 2:
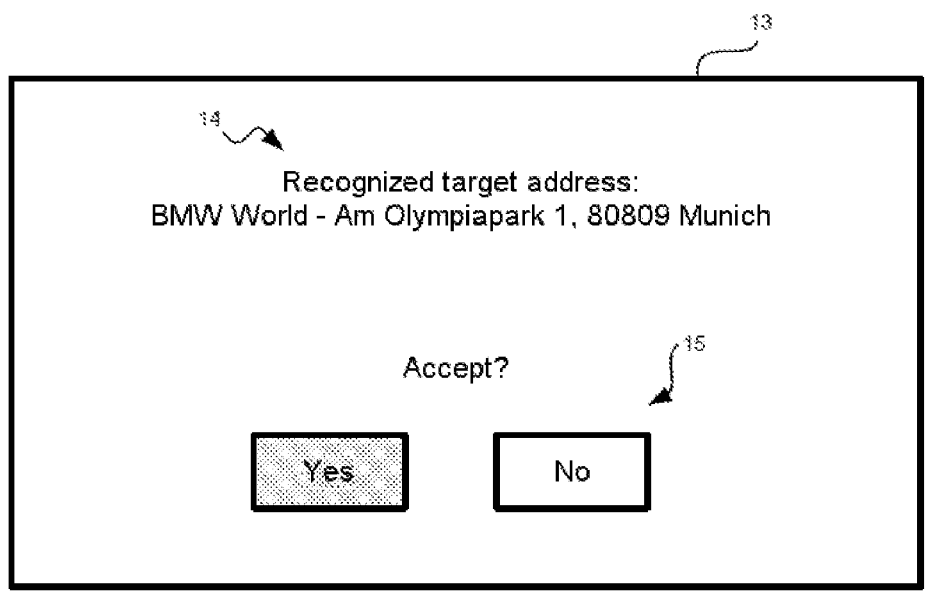
FIG. 2 is a diagram showing the display of a target address.

In FIG. 2, an exemplary display on a screen 13 provided in the navigation system 2 is shown after both the one navigational keyword has been identified and a target address has been identified in the navigation database 7 within the ten words mentioned by way of example from a telephone call conducted by the vehicle driver with a call partner. For example, the call section could have been, "please drive to BMW World in Munich". The associated target address data stored in the navigation database 7, in this case "BMW World—at Olympiapark 1, 80809, Munich" is correspondingly displayed in a display area 14 of the screen 13. In display area 15, the vehicle driver is requested by means of two selection keys "yes", "no" to confirm or reject the potential target displayed. In addition, a countdown can be displayed to the vehicle driver, e.g. in the form of a progress bar (not shown in FIG. 2). If the vehicle driver has not made a selection before completion of the countdown, the potential target can be automatically rejected. If the vehicle driver confirms this, for example by means of a scroll wheel provided in the vehicle 1, or with a finger pressure on the screen 13 if the latter is constructed as a touch screen, or acoustically by way of the hands-free device 10 and the voice recognition device 9, this is automatically accepted for route guidance by the navigation system 2 and the route guidance takes place by use of the GPS sensor 6 for the vehicle 1.

Figure 3:
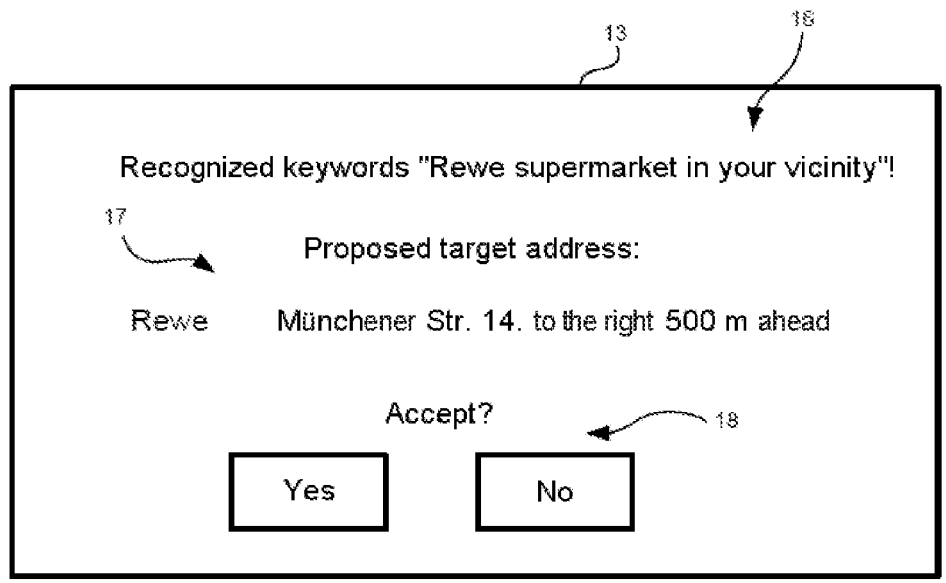
FIG. 3 is a diagram showing a target address display on the basis of keywords.

In the exemplary embodiment shown in FIG. 3, it is indicated in area 16 of the screen 13 that the keywords "Rewe supermarket in your vicinity" have been recognized by the voice recognition device 9 and, based on the current position at which the vehicle 1 is located, the address "Münchener Street 14" has been identified as nearest target address of a corresponding supermarket. In addition, it is indicated that this address is located to the right 500 m ahead in the direction of driving. In the display area 18, the vehicle driver will be requested again by means of two selection keys to confirm or reject the potential target displayed.

Figure 4:
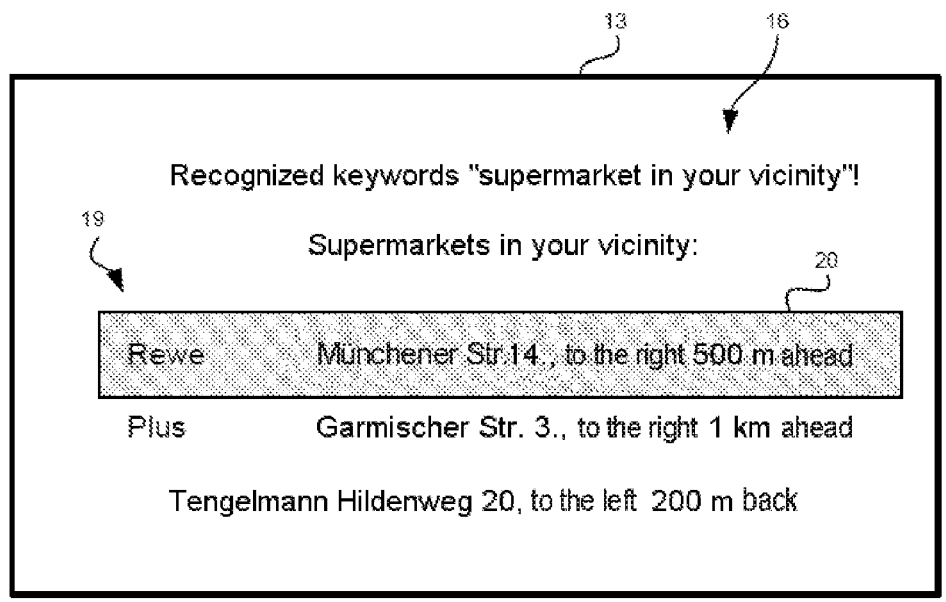
FIG. 4 is a diagram showing the display of selectable target addresses.

In the exemplary display shown in FIG. 4, only the keywords "supermarket in your vicinity" were recognized in accordance with the display in area 16 which took place here, but no name of the relevant trading chain. Correspondingly, a list is displayed in area 19 in which the three supermarkets nearest to the current vehicle position are indicated as potential targets. The display control for the screen 13 is configured in such a manner that the vehicle driver, e.g., can navigate within this list by use of a scroll wheel and can select one of the entries as target for transferring into the route guidance of the navigation system 2.

Figure 5:
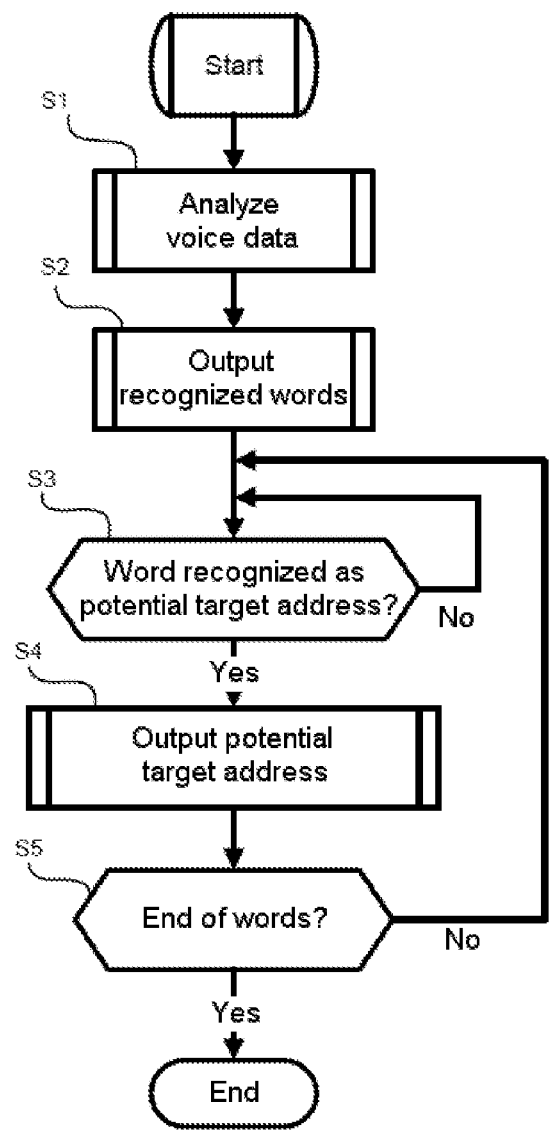
FIG. 5 is a flowchart for a target address search.

In FIG. 5, an exemplary embodiment of a procedural sequence according to the invention is shown. After the start of the process, in a step S1, digital voice data, which are generated as part of a telephone call conducted by mobile radio, for example between a vehicle driver and his call partner outside the vehicle, are analyzed by means of a voice recognition device. Words recognized during this process are output in each case in a step S2. In a step S3, it is checked by way of a comparison of the word with address data stored in a navigation database, whether the word can be allocated to an address as a potential target address. This can take place, for example, by concrete address data such as a zip code, a town name and/or a street name and possibly with a house number. A number of words adjacent to the recognized word can also be examined in step S3. Other target information such as the specification of a POI name, a target category, etc. can also be used for recognition as a target address.

If the recognized, spoken word or the words, respectively, has been recognized in step 3 as a potential target address, its data are output in a step S4, otherwise, step S3 is executed for the next recognized word. In step S5, it is checked whether the end of the recognized words has been reached and the process may be ended. Otherwise, step S1 is executed again in order to analyze the next word in the voice data. Step S1 does not mandatorily need to be ended completely for all voice data before steps S2, S3 etc. are executed but can be executed in parallel thereto, e.g. during the telephone call made, words recognized during the analysis being output continuously "on-the-fly" according to step S2 and, for example, being stored in a word list which is progressively processed in steps S3 etc. until it is recognized as empty in step S5 and the process is then ended.

Figure 6:
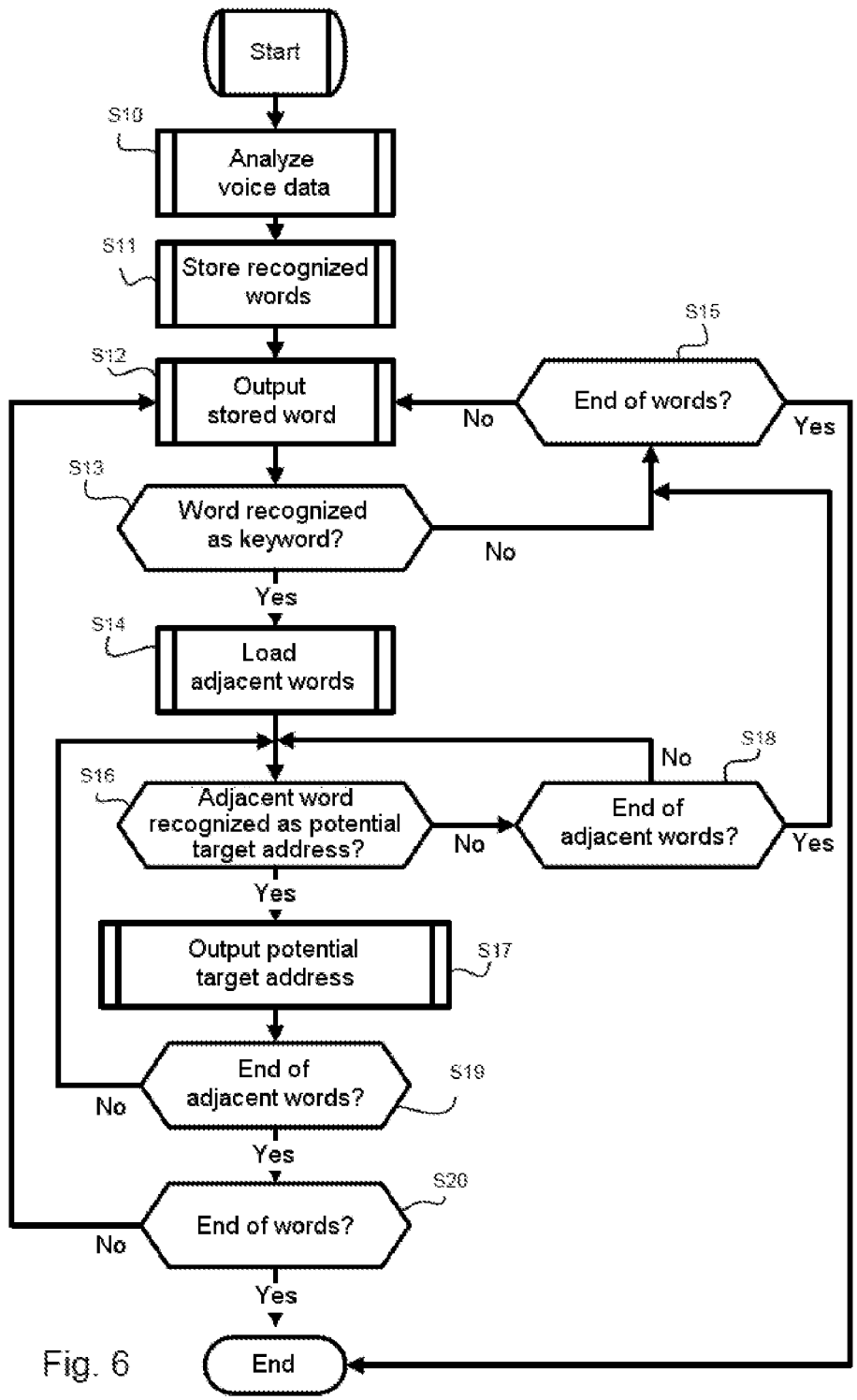
FIG. 6 is a flowchart with a keyword search.

In FIG. 6, an exemplary embodiment for a procedural sequence is shown which is extended by a keyword search compared with the exemplary embodiment shown in FIG. 5. In this process, a keyword is sought in each case for starting a search for potential target addresses. In step S10, voice data of a call are analyzed as previously in step S1 and words recognized during this process are stored in step S11. In step S12, a stored word is progressively output in each case and this is examined in step S13 by comparison with the words stored in a keyword database to determine whether it is a keyword for an address search, such as, for example, the word "address". In a procedural sequence extended compared with the exemplary embodiment shown here, a sequence of several words, limited in number by a top limit, can also be used, instead of one word, as a phrase for the keyword search and compared with correspondingly long phrases stored in the keyword database. A phrase can be, for example, the word sequence "please drive . . . ". The top limit could be, for example, between 2 and 20 words.

If, in step S13, a word is recognized as keyword, a predetermined number of words adjacent to, i.e. preceding and/or following, the recognized word in the word sequence of the call, are loaded in step S14 for further examination. The number for adjacent words can be, for example, also between 2 and 20 words.

If the word examined in step S13 is not recognized as a keyword, it is checked in step S15 whether the end of the words stored in step S11 is reached and the process is possibly ended. Otherwise, the next word in the list of loaded words is output according to step S12 and this word is examined in accordance with step S13.

The adjacent words loaded in step S14 are progressively checked in step S16, analogously to step S3 of FIG. 5, as to whether they can be allocated to a target address stored in the navigation database by means of the corresponding geographic data, address data and/or category data, etc. If such an allocation is possible, i.e. if a potential target address is recognized, data of this address are output in step S17. Otherwise, it is checked in step S18 whether the end of the group of adjacent words is reached and, if necessary, step S15 is accessed to check whether the end of all recognized and stored words is reached. If it is found in step S18 that the end of the adjacent words is not yet reached, step S16 is executed for the next adjacent word.

After an output of a potential target address in step S17, it is checked in step S19 whether the end of the adjacent words is reached and possibly checked in step S20 if the end of all recognized words stored in step S11 is reached. If necessary, the process is then ended.

If it is found in step S19 that the end of the adjacent words has not yet been reached, step S16 is executed again for a check of the next adjacent word. If it is found in step S20 that the end of all recognized words stored in step S11 is not yet reached, step S12 is again executed for the corresponding next word.

Although actual exemplary embodiments for methods are described in FIGS. 5 and 6, methods according to the invention can also be carried out differently or in a modified manner. For example, steps S13 and S16 can be combined to form one step, particularly if phrases assembled from location and action information are used for determining a potential target address such as e.g. "drive to the supermarket in Adelheid street".

The devices and system components described in the present document, particularly the comparison devices mentioned, can be controlled by means of computer programs or configured as such. For this purpose, they can have other elements, known per se, of computers and digital control facilities such as a microprocessor, volatile and non-volatile memories, interfaces, etc. or interact with such. The invention can, therefore, also be implemented wholly or partially in the form of a computer program product which, when loaded and executed on a computer, wholly or partially effects a sequence according to the invention. It can be provided, for example, in the form of a data medium such as a CD/DVD or also in the form of one or more files on a server from which the computer program can be downloaded.

Vehicles in the sense of the present description can be, in particular, motor cars, motor trucks, motorcycles and buses.

Although, in particular, a navigation system which is integrated in a vehicle is specified in the description, the invention can also be used for other navigation systems. For example, it can also be advantageously used for a freely portable navigation system or for a navigation system which is integrated in another electronic device such as, for example, a mobile radio device, particularly a so-called smartphone, or in a tablet PC or in a clock, a so-called smart watch. Instead of the Bluetooth radio link mentioned, another wireless or wire-connected link can also be used as interface between the respective system components.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of inputting navigational target data into a navigation system of a vehicle via a mobile communication device disposed in the vehicle, the method comprising the acts of:
    processing, via a voice recognition device in the navigation system, voice signals received from the mobile communication device via a mobile radio voice link in order to recognize spoken words from a user of the navigation system as the navigational target data;
    based on at least one word recognized during the processing act, comparing the navigational target data with navigational target entries stored in a navigation database in the navigation system;
    when the navigational target data matches a particular navigational target entry from the comparing act, automatically accepting the particular navigational target entry as a navigation target in the navigation system without an input by the user;
    when the navigational target data fails to match a particular navigational target entry from the comparing act, requesting an input from the user to accept or reject a potential navigational target, and, if the user does not accept or reject the potential navigational target within a predetermined time, automatically rejecting the potential navigational target entry as the navigation target in the navigation system;
    displaying the particular navigational target entry on a display in the vehicle;
    presetting at least one output rule for outputting the navigational target entry on the display; and
    presetting at least one comparison rule for use in the act of comparing the navigational target data with navigational target entries based on the at least one word recognized by the voice recognition device;
    wherein the navigational target entries include a category of the navigation target, the category corresponds to a point-of-interest, and the at least one word recognized by the voice recognition device is compared to the category of the point-of-interest and compared to a name of the point-of-interest.

2. The method according to claim 1, wherein:
    in addition to comparing the navigational target data with the navigational target entries, the method further comprises performing a keyword comparison between at least one spoken word recognized by the voice recognition device and at least one navigational keyword stored in a database.

3. The method according to claim 2, wherein for comparing the at least one spoken word with the at least one navigational keyword, the method uses at least two spoken and recognized words which, in the spoken context, have a predetermined minimum distance and/or a predetermined maximum distance from one another.

4. The method according to claim 1, wherein for comparing the targets with the navigational target entries by means of the at least one word recognized by the voice recognition device, the method uses at least two spoken and recognized words which, in the spoken context, have a predetermined minimum distance and/or a predetermined maximum distance from one another.

5. The method according to claim 1, further comprising the act of selecting, via an input unit, the particular navigational target entry output on the display.

6. The method according to claim 1, further comprising the act of presetting at least one comparison rule for use in the act of comparing the navigational target data with navigational target entries based on the at least one word recognized by the voice recognition device.

7. The method according to claim 1, wherein an order of the spoken words is optionally taken into consideration in the comparing act.

8. The method according to claim 1, wherein, when requesting the input from the user to accept or reject the potential navigational target, a countdown indicating an amount of time left in the predetermined time is displayed on the display.

9. The method according to claim 1, further comprising, when an additional navigation target is recognized after selection of the navigation target, presenting an option to the user to select the additional navigation target as a new intermediate target along a route to the navigation target.

10. An input system for input of navigational target data into a navigation system of a vehicle via a mobile communication device disposed in the vehicle, comprising:
    a voice recognition device disposed in the navigation system and configured to process voice signals received from the mobile communication device via a mobile radio voice link, the voice recognition device recognizing spoken words from a user of the navigation system as the navigational target data;
    a target comparison device configured to compare at least one word recognized by the voice recognition device with navigational target entries stored in a navigation database in the navigation system, wherein
    when the target comparison device matches the at least one word recognized by the voice recognition device to a particular navigational target entry, the target comparison device automatically accepts the particular navigational target entry as a navigation target in the navigation system without an input by the user; and a display disposed in the vehicle that displays the particular navigational target entry;

wherein, when the navigational target data fails to match a particular navigational target entry from the comparing act, the target comparison device requests an input from the user to accept or reject a potential navigational target, and, if the user does not accept or reject the potential navigational target within a predetermined time, the target comparison device automatically rejects the potential navigational target entry as the navigation target in the navigation system;

wherein at least one output rule for outputting the navigational target entry on the display is preset;

wherein at least one comparison rule for use in the act of comparing the navigational target data with navigational target entries is preset based on the at least one word recognized by the voice recognition device; and wherein the navigational target entries include a category of the navigation target, the category corresponds to a point-of-interest, and the at least one word recognized by the voice recognition device is compared to the category of the point-of-interest and compared to a name of the point-of-interest.

11. The input system according to claim 10, wherein an order of the spoken words is optionally taken into consideration when the target comparison device compares the at least one word recognized by the voice recognition device with the navigational target entries stored in the navigation database.

12. The input system according to claim 10, wherein, when the target comparison device requests the input from the user to accept or reject the potential navigational target, a countdown indicating an amount of time left in the predetermined time is displayed on the display.

13. The input system according to claim 10, wherein, when an additional navigation target is recognized after selection of the navigation target, an option is presented to the user to select the additional navigation target as a new intermediate target along a route to the navigation target.

14. A vehicle, comprising:
a navigation system into which is input navigational target data;
a mobile communication device;
wherein the navigation system includes:
a mobile radio voice link associated with the vehicle that receives voice signals from the mobile communication device; and
an input system to provide the navigational target data for input into the navigation system, the input system comprising:
a voice recognition device configured to process voice signals from a user of the navigation system transmitted via the mobile radio voice link associated with the vehicle;
a navigation database that stores the navigational target data;
a target comparison device configured to compare at least one word recognized by the voice recognition device of the processed voice signals with the navigational target data stored in the navigation database, wherein
when the target comparison device matches the at least one word recognized by the voice recognition device to a particular navigational target entry, the target comparison device automatically accepts the particular navigational target entry as a navigation target in the navigation system without an input by the user; and
when the navigational target data fails to match a particular navigational target entry from the comparing act, the target comparison device requests an input from the user to accept or reject a potential navigational target, and, if the user does not accept or reject the potential navigational target within a predetermined time, the target comparison device automatically rejects the potential navigational target entry as the navigation target in the navigation system;
wherein at least one output rule for outputting the navigational target entry on a display is preset;
wherein at least one comparison rule for use in the act of comparing the navigational target data with navigational target entries is preset based on the at least one word recognized by the voice recognition device; and
wherein, in the act of accepting the particular navigational target entry as the navigation target in the navigation system, the particular navigational target entry is output on the display; and
wherein the navigational target entries include a category of the navigation target, the category corresponds to a point-of-interest, and the at least one word recognized by the voice recognition device is compared to the category of the point-of-interest and compared to a name of the point-of-interest.

15. The vehicle according to claim 14, wherein an order of the spoken words is optionally taken into consideration when the target comparison device compares the at least one word recognized by the voice recognition device with the navigational target entries stored in the navigation database.

16. The vehicle according to claim 14, wherein, when an additional navigation target is recognized after selection of the navigation target, an option is presented to the user to select the additional navigation target as a new intermediate target along a route to the navigation target.

* * * * *